Jan. 6, 1942.  M. R. ANSTICE  2,269,301
MIXING MACHINE IMPLEMENT OR TOOL
Filed Aug. 25, 1939  2 Sheets-Sheet 1
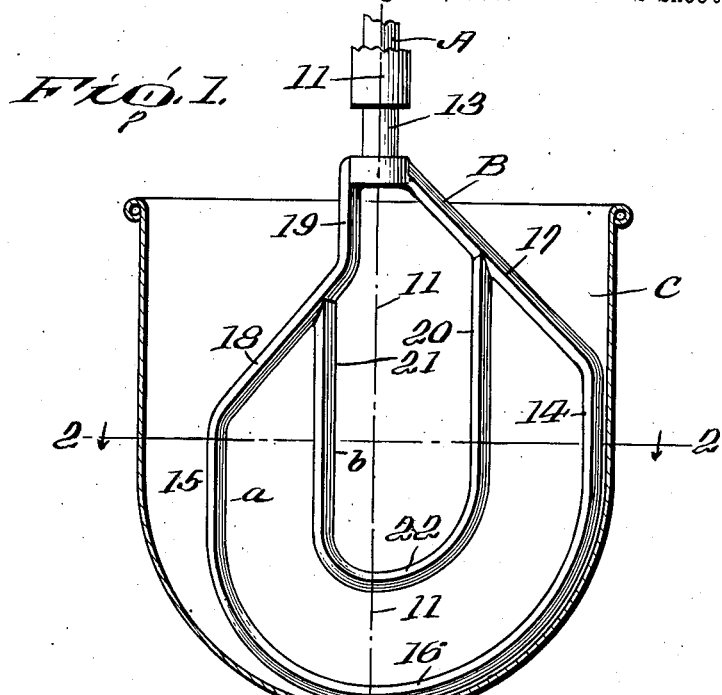
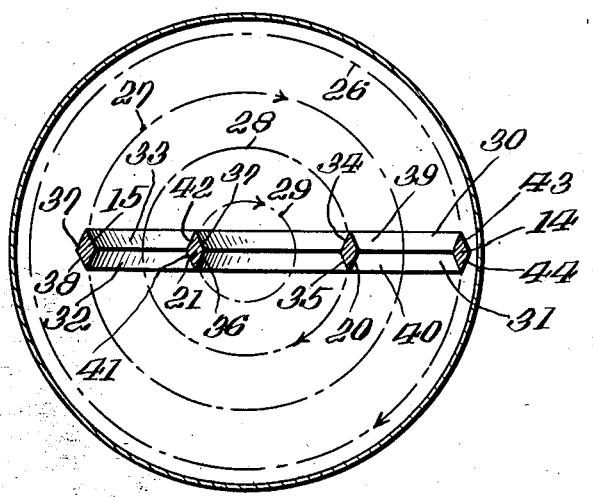
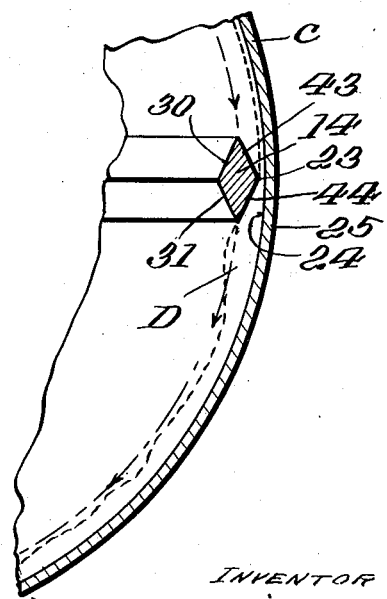
INVENTOR
M. R. Anstice
ATTORNEYS

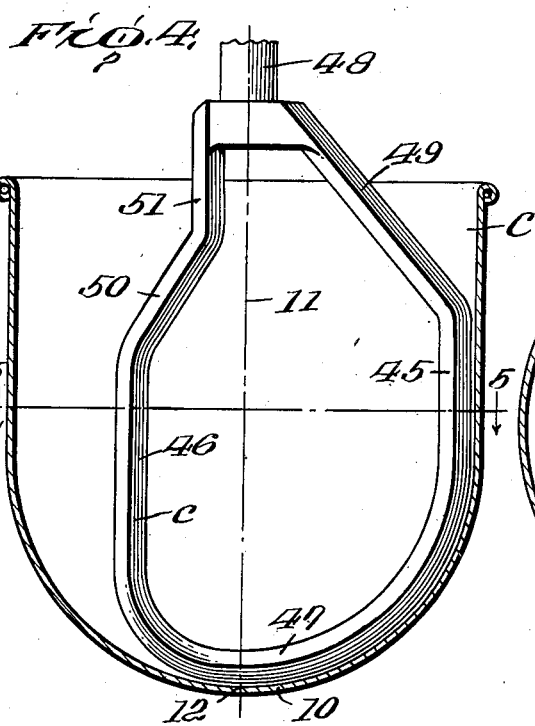
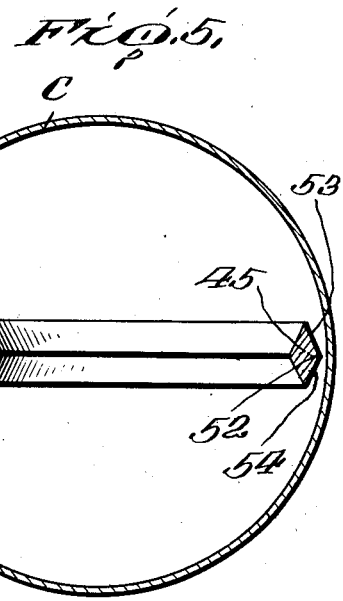
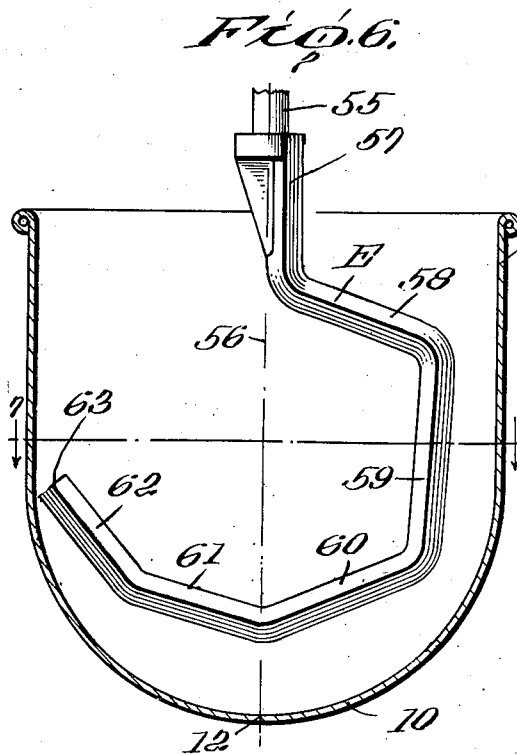
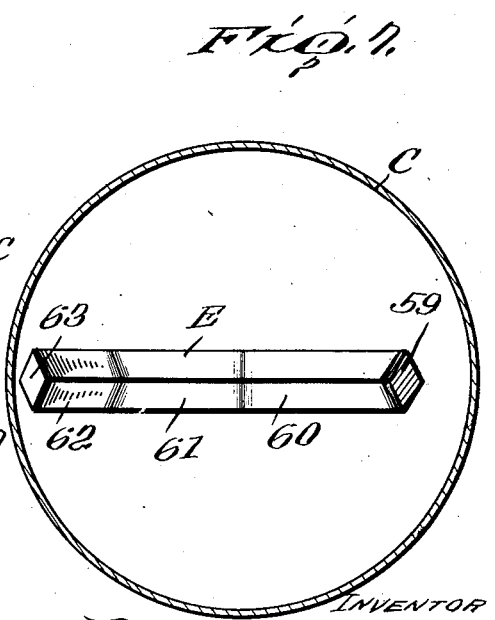

Patented Jan. 6, 1942

2,269,301

UNITED STATES PATENT OFFICE 2,269,301

MIXING MACHINE IMPLEMENT OR TOOL

Mortimer R. Anstice, Rochester, N. Y., assignor to Josiah Anstice & Company, Inc., Rochester, N. Y., a corporation of New York Application August 25, 1939, Serial No. 291,975

8 Claims. (Cl. 259—107)

The present invention relates to tools or implements which when used in combination with a mixing machine actually physically engage the matter or material which is to be agitated, mixed, stirred, beaten, kneaded, stretched, etc., and by reason of the use to which they are put these implements or tools are commonly referred to as beaters and dough hooks.

The implements or tools constituting the present invention have driving connection with the rotary drive shaft of a mixing machine and are used or worked within a mixing bowl which bowl is the container for the material being operated upon.

To obtain the highest degree of efficiency the bowl has a rounded bottom, but it is to be recognized that the objects and advantages of the invention can be obtained, even if to a lesser degree, with bowls having substantially flat bottoms.

Additionally the particular objects and improved results of the present invention are obtained by placing the parts so that the longitudinal axis of the beater drive shaft to which the tools are connected is in direct axial alignment with the center of the bottom of the mixing bowl.

The primary object of the invention is that of providing mixing machine tools or implements which operate to a greater and higher degree of efficiency in performing and accomplishing the desired resultant effect in the mixture of material being operated upon.

Another object of the invention is a novel arrangement and combination of mixing machine drive shaft, mixing bowl, and material working tool or implement to obtain a greatly improved result in the mixing, stirring, agitating or other desired action.

A still further object of the invention is the provision of mixing machine working tools or implements which are constructed in a specifically novel and improved form.

Another and further object of the present invention is the provision of mixing machine tools or implements which are extremely simple and comparatively cheap of manufacture yet highly efficient in operation.

Other specific objects, novel features of construction and improved results of the invention will appear from the following description when read in the light of the accompanying drawings which illustrate several embodiments of tools incorporating the present improved invention.

In the drawings:

Fig. 1 is a view in side elevation of a beater disposed within a mixing bowl, the mixing bowl being shown in vertical section.

Fig. 2 is a transverse or horizontal sectional view on the line 2—2 of Figure 1 looking in the direction indicated by arrows.

Fig. 3 is a detailed enlarged schematic view in horizontal section illustrating the cooperative action between the beater and the interior side wall of a mixing bowl.

Fig. 4 is a view in side elevation of a second form of beater within a mixing bowl, the mixing bowl being shown in vertical section.

Fig. 5 is a horizontal transverse sectional view on the line 5—5 of Figure 4 looking in the direction indicated by arrows.

Fig. 6 is a view in front elevation of a dough hook disposed within a kneading bowl, the kneading bowl being shown in vertical section.

Fig. 7 is a transverse horizontal sectional view on the line 7—7 of Figure 6 looking in the direction indicated by arrows.

Preliminary to a specific description of each tool or implement it is to be understood that the implements are suitable and designed for uses upon specific materials which vary from fluids through semi-fluids and to and including solid ingredients. As an example the tools or implements may be used for operation upon or working of marshmallow icing and other icings, light cake batters and other cake batters such as pound and layer cake, cooky batter, batter for waffles and pancakes and for muffins, etc., for agitating the ingredients which go into puree soups, beating of potatoes and the agitation of vegetables such as turnips, etc., and operation upon doughs of all kinds. The foregoing of course constitutes only a partial list of ingredients or materials upon which the implements are suited for operation.

Referring now specifically to the drawings, and particularly Figures 1 to 3 inclusive thereof, the tool or implement here illustrated will be referred to as a beater and is particularly suited for operation upon lighter materials or ingredients which do not offer too great a resistance to the rotative movement of the beater such as shortening and sugar, icings and batters of all kinds.

Describing broadly the construction appearing in these three figures of the drawings, A designates the drive shaft of a mixing machine, B the implement or beater, and C the mixing bowl.

The mixing bowl is provided with a rounded bottom 10 and it is to be observed that the longitudinal axis of the mixing machine drive shaft which is designated by the line 11 is in axial alignment with the center of the bottom of the bowl which central point is designated at 12. It is to be further observed that the beater is provided with a stub shaft 13 which is suitably connected to the mixing machine drive shaft A and that the line 11 representing the longitudinal axis of the drive shaft passes axially through the center of the beater stub drive shaft.

The beater or tool B is made up of a plurality of what I term, for lack of a better name, arms, both of which can be properly described as being of a U-shape when viewed from the side. There is an outer arm designated as an entirety by $a$ and an inner arm designated as an entirety by $b$. The outer arm has a U-shaped section or portion made up of a vertical leg portion 14 and a shorter oppositely disposed leg portion 15 joined by the rounded or curved bottom portion 16. The upper end of the leg portion 14 is joined to the implement stub shaft 13 by an inwardly and upwardly inclined leg 17 while the leg 15 is joined to the stub shaft by an inwardly and upwardly inclined leg 18 and a vertically disposed or extending supplemental leg portion 19.

The inner arm $b$ of the beater is more definitely of a U-shape in its entirety in that it has a vertical leg 20 and a shorter vertical leg 21 joined together by a curved or rounded bottom portion 22. The upper ends of the legs 20 and 21 are connected and merge into the before-referred to inwardly and upwardly inclined legs 17 and 18.

All of the leg portions making up the material working arms $a$ and $b$ are of a diamond shape in cross section as will be clearly apparent from Figures 2 and 3 of the drawings. Although Figure 2 of the drawings illustrates the cross sectional shape only of the legs 14, 15, 20 and 21 it is to be understood that this diamond shaped cross sectional configuration also runs through the bottom portions 16 and 22 of the arms as well as through the legs 17, 18 and 19.

The relative dimensions of the beater or tool and that of the mixing bowl is of the greatest importance and are such that the apex 23 at the outer side of the arm 14 is disposed very closely adjacent the inner surface or face 24 of the side wall 25 of the mixing bowl. This close association of the apex of the leg 14 with the mixing bowl continues around the bottom of the mixing bowl and to a point well beyond the point 12 constituting the bottom of the mixing bowl with the result that the major portion of the rounded bottom 16 of the outer arm $a$ is disposed so that its outer apex is in very close proximity to the inner face or surface of the bottom 10 of the mixing bowl.

It is also of importance in obtaining the best and improved results of the present invention that none of the arm or leg portions of the tool move or rotate through the same plane and I have endeavored to illustrate this fact in Figure 2 of the drawings where it will be seen that the legs 14 and 15 rotate on a path indicated by the circles 26 and 27 respectively while the legs 20 and 21 move in the paths designated by the circles 28 and 29 respectively and in the direction indicated by arrows.

With a construction such as described the parts of which are disposed as described, the arms of the implement or beater work or operate upon a mixture within the mixing bowl in a manner whereby the diamond shaped cross sectional configuration of the arms have what might be termed a snow plow effect. That is to say, the beveled faces 30, 31, 32 and 33 of the legs 14 and 15 tend to throw or force towards the center of the bowl the matter being operated upon and this is repeated by the beveled faces 34, 35, 36 and 37 of the legs 20 and 21. The upper beveled faces of the bottom portions 16 and 22 of the arms tend to elevate or agitate the material upwardly. The outer beveled faces of the legs 15, 17, 18 and 19 tend to move the material towards the side walls of the bowl while the inner beveled faces of the legs 17, 18 and 19 tend to move the material being operated towards the center of the bowl. The outer beveled faces 39, 40, 41 and 42 of the legs 20 and 21 tend to move the material towards the side walls of the bowl and will tend to intermix it with the material which is being moved towards the center of the bowl by the inner beveled faces of the legs making up the outer arm $a$.

Without going into greater detail it will be seen that inevitably a very efficient mixing and agitation of the material within the bowl is provided and this mixing or agitation is in the nature of a folding action and it has been found that it is such that just the proper amount of air is admitted to the material or batter to make it light and in the best condition for baking.

The action of the outer beveled faces 43 and 44 of the leg 14 and bottom 16 of the outer arm $a$ is of the greatest and particular importance. When mixing shortening and sugar it is of course important as well as essential that these be creamed together. The shortening will be thrown or move out to the side of the bowl and adhere thereto. The apex 23 of the leg 14 and the bottom 16 moves as close to the inner side wall of the mixing bowl as is practically possible to prevent actual engagement. The result of this is that the shortening with the intermixed sugar adhering to the inner side of the mixing bowl and which I have designated in dotted lines in Figure 3 of the drawings as D, is squeezed between the inner side of the mixing bowl and the beveled faces 43 and 44 with the result that it is creamed in much the same fashion as shortening is ordinarily creamed by the manual use of a spoon in a kitchen bowl.

As the creaming action is being accomplished the shape of the arms $a$ and $b$ and their particular disposition cause the ingredients being worked upon to be thrown back and forth between the arms, that is to say, the ingredients of the mixture are thrown from the circular path followed by one of the legs of a mixing arm into the circular path of travel of one of the other legs of the mixing arms and in this way a complete and efficient beating or mixing is accomplished through the constant movement of the material.

The inclined legs 17 and 18 do not move in the same path and are so disposed that the major portions of their length do not reach the top of the bowl and this is done to prevent any of the material within the bowl from being spilled out or over the top edge thereof. Careful examination of the drawings will clearly show that none of the portions of the arms $a$ and $b$ travel in the same paths.

By the use of an implement or beater such as illustrated in Figures 1 to 3 of the drawings it has been found that they cream, mix, and make cake batter of the finest texture, quality and volume and that this accomplished with less use of a spatula than is required in the ordinary mixing machine using an ordinary beater or tool. The fact that the use of a spatula is less often required results in a more rapid operation.

Figures 4 and 5 of the drawings illustrate a beater or implement specifically different from that heretofore described yet one which operates on the same principle. The implement illustrated in these figures of the drawings is particularly suited for operation upon a material of a heavier or thicker nature than that for which the previously described implement is intended. The material being heavier or thicker offers a greater resistance to the rotative movement of the implement and to compensate for this I have in this instance eliminated the inner arm b and utilized only a single arm which I designate as an entirety by c and which in configuration is closely similar to the outer arm a of the previously described beater in that it comprises the oppositely disposed vertically extending legs 45 and 46 joined together by the curved or arc shaped bottom portion 47 and which are connected to a stub shaft 48 by an inwardly and upwardly inclined leg 49 and a second inwardly and upwardly inclined leg 50 terminating in a vertical leg 51.

The stub shaft 48 is intended for connection with the mixer shaft A and there is the same mixer bowl C.

Just as previously described in respect to the other beater all the legs making up the beater arm c are of a diamond shape in cross sectional configuration. In Figure 5 of the drawings the cross sectional configuration of the legs 45 and 46 are illustrated and it will be seen that the apex 52 of the leg 45 is positioned as close as possible to the inner side wall of the mixing bowl and that this close association is continued on past the center of the bottom 10 of the bowl with the result that the same creaming and squeezing action between the beveled faces 53 and 54 of the leg 45 and the side of the bowl, which has previously been explained, is obtained. It will also be obvious that the beveled surfaces or faces of the several legs making up the arm c will move the material within the bowl in the same manner which has been described in respect to the legs of the arm a of the beater B hereinbefore described. Likewise the inwardly inclined legs 49 and 50 in addition to performing their mixing and agitating action will prevent overspill. Furthermore, just as previously explained, the longitudinal axial center of the stub shaft 48 which is designated by the line 11 passes vertically through the center of the bottom 10 of the mixing bowl as is indicated at the point 12. This particular implement or beater is admirably suited to work the ingredients constituting pastry and similar things the consistency of which is too heavy to permit the use of the additional mixing arm illustrated and described in respect to the first described beater B.

In Figs. 6 and 7 of the drawings the application of the principles of this invention are shown applied to a dough hook which is designated as an entirety by E and is disposed within a mixing bowl or container which is again designated as an entirety by C and as having the same rounded bottom 10.

The hook is provided with a stub shaft 55 intended and adapted for driving connection with the mixing machine drive shaft A and here again the longitudinal axis of the stub shaft, which is designated by the line 56, is in vertical alignment with the center point 12 of the bottom of the mixing bowl.

The dough hook comprises a plurality of straight leg portions. Starting at the stub shaft there is a vertically disposed leg 57 from the lower end of which extends an outward and slightly downwardly extending leg 58 which merges into a substantially vertically disposed leg 59 which extends downwardly and slightly inwardly. The leg 59 in turn merges into a downwardly and inwardly extending leg 60 having a complementary leg 61 which extends upwardly and outwardly and terminates in the leg portion 62 which extends outwardly and upwardly to a greater degree than the leg 61 and has its end 63 terminating very closely adjacent the inner side wall of the mixing bowl.

All of the legs constituting the hook are of a diamond shape in cross sectional configuration as clearly appears in Figure 7 of the drawings.

The construction, configuration and disposition of the dough hook within the mixing bowl is such as to produce a very superior dough for baking. This is due to the fact that the obliquely arranged faces of the hook legs actually knead the dough by folding the dough rather than cutting through it as do those dough hooks with which I am familiar and which are in common use. Dough is of course very sticky and as a consequence has a tendency to adhere to the sides of the mixing bowl, but due to the odd shape of the dough hook and the close proximity of its end 63 to the side of the mixing bowl as well as the fact that the leg 59 of the hook travels in a circular path fairly closely adjacent the inner side of the mixing bowl, the hook tears the dough away from the side of the bowl and the aforementioned obliquely arranged surfaces of the hook legs knead and fold it. Before the mixing and kneading operation is complete the dough has actually wound itself around the arms or legs of the dough hook and at this stage of the operation the hook is revolving more rapidly than the dough with the result that the legs of the hook passing through the dough impart to it a perfect kneading action.

The result of the foregoing is that the dough hook kneads and rolls the dough rather than tearing through it and this results in the production of a dough which is of better texture.

Attention is directed to the fact that the food or ingredient engaging and mixing arms are so disposed that each of the vertically disposed portions of the arms are spaced approximately an equal distance from one another with the result that each of them in its movement describes a circle which is approximately an equal distance from the circle described by the arms next adjacent to it on either side. With this disposition of the arms I have found the best results to be obtained. This spacing of the arms has been found advantageous.

The present invention having the longitudinal axis of the beater drive shaft in direct alignment with the center of the bowl does away with the planetary gear head so commonly used and found in most mixers. In the planetary head type of mixer the bottom of the bowl has a centrally arranged upwardly extending portion which causes a small cone of practically unmixed mixture above it when the machine is in operation. This is decidedly an undesirable result in the operation of this type of machine. Furthermore in the planetary type the beaters or food working implements are only, at most, one-half the diameter of the bowl which is again undesirable. Additionally in the planetary type it has been found that the ingredients making up the mixture are not thoroughly mixed as the mixture has a tendency to revolve or move around in the bowl with the beater or other mixing tool as it revolves around in a circle about the center of the bowl.

All of the above objectionable features of a planetary type of mixer are overcome by my invention the nature of which is such as to very rapidly and thoroughly intermix the ingredients in the mixture being operated upon.

I claim:

1. A rotary implement for mixing food or the like comprising, a drive member by which the implement is adapted to be rotated, a food engaging arm secured to and rotatable with said member, said arm having a substantially U-shaped portion, oppositely inwardly inclined and upwardly extending portions interconnecting the upper end of said U-shaped portion to said drive member, one of said inclined arm portions being disposed in a plane above the other and upon rotation of said arm said portions traveling in non-intersecting paths, and the leading sides of the portions making up said food engaging arm being substantially V-shaped in cross sectional configuration.

2. In combination, a rounded bottom mixing bowl for food or the like, a rotary drive shaft having its axis of rotation fixed in vertical alignment with the center of the bottom of said container, a food working implement having axially aligned drive connection with said shaft, said implement provided with a plurality of food engaging arms, one of said arms constituting a loop having a rounded bottom, the other of said arms being a second loop disposed within said first loop and likewise having a rounded bottom, all of said arms throughout their lengths being of a diamond shape in cross sectional configuration, the outermost point or apex of one of the side portions and bottom of said loop being disposed just to clear physical engagement with the side wall and bottom of said bowl as the implement is rotated therein, and all of the portions making up the side portions of said loops being disposed to travel in concentric non-intersecting paths within said container.

3. A mixing implement comprising a drive shaft, an elongated arm extending downwardly and outwardly from one side of said shaft, a second leg portion extending downwardly from the opposite side of said shaft and disposed in separated parallel relationship to the longitudinal axis of said shaft, a third leg portion extending downwardly and outwardly from the lower end of said second leg portion and having its lower end terminating in a plane below the termination of said first named leg portion, a loop leg interconnecting the lower ends of said first and third named leg portions, said loop being substantially of a U shape with the sides of said loop being disposed in vertical planes and interconnected by a rounded bottom portion having a curvature identical to the curvature of the bottom of the utensil with which the implement is intended for use, and the vertical side portions of said loop being disposed in spaced parallel relationship to the longitudinal axis of said drive shaft but at different distances at opposite sides thereof, whereby upon rotation the side portions of said loop travel in concentric non-intersecting paths.

4. A mixing implement comprising a drive shaft, an open framework suspended therefrom and comprising, a leg extending downwardly and outwardly from one side of said shaft, a second leg extending downwardly from the opposite side of said shaft and in separated parallel relationship to the longitudinal axis of said shaft, a third leg portion extending downwardly and outwardly from the lower end of said last named leg portion, a leg bent to form a loop and interconnecting the lower ends of said first and third named leg portions, a second loop within said first loop and formed of a leg the upper ends of which are connected to the two aforementioned downwardly and outwardly inclined legs, those portions of the leg forming the sides of both of said loops being disposed in spaced parallel relationship to one another and to the longitudinal axis of said shaft, and all of said leg loop side portions being disposed at different radial distances from the axis of rotation of said drive shaft, whereby upon rotation of the implement all of said legs travel in concentric non-intersecting paths.

5. A mixing element comprising, a drive shaft, an arm extending downwardly and outwardly from one side of said shaft, a second arm shorter than the first and extending downwardly and outwardly from the opposite side of said shaft, a loop leg interconnecting the lower ends of said pair of arms, said loop being substantially of a U-shape with the sides of said loop disposed in vertical planes and interconnected by a rounded bottom portion, and the vertical side portions of said loop being disposed in spaced parallel relationship to the longitudinal axis of said drive shaft but at different distances at opposite sides thereof, whereby upon rotation the side portions of said loop travel in concentric nonintersecting paths.

6. A construction such as defined in claim 5, wherein, the lower end of the second arm extends to and terminates in a plane below the termination of said first named arm.

7. A mixing element comprising, a drive shaft, an open framework suspended therefrom and comprising, an arm extending downwardly and outwardly from one side of said shaft, a second and shorter arm extending downwardly and outwardly from the opposite side of said shaft, a third arm bent to form a loop and interconnecting with the lower ends of said first and second named arms, a second loop within said first loop and formed of an arm the upper ends of which are connected to the two aforementioned downwardly and outwardly extending arms, those portions of the arms forming the sides of both of said loops being disposed in spaced parallel relationship to one another and to the longitudinal axis of said shaft, and all of said arm loop side portions being disposed at different radial distances from the axis of rotation of said drive shaft, whereby upon rotation of the implement all of said arms travel in concentric nonintersecting paths.

8. A construction such as defined in claim 7, wherein, the lower end of the second named downwardly and outwardly extending arm extends to and terminates in a plane below the termination of said first named downwardly and outwardly extending arm, and wherein the upper ends of the arm forming the second loop join the two outwardly and downwardly extending arms at points lying in different horizontal planes.

MORTIMER R. ANSTICE.